United States Patent [19]
Kasper et al.

[11] Patent Number: 4,510,714
[45] Date of Patent: Apr. 16, 1985

[54] POWERED OUTWARD-OPENING CARGO DOOR

[75] Inventors: James R. Kasper, Seattle; Allan W. Opsahl, Renton, both of Wash.

[73] Assignee: The Boeing Company, Seattle, Wash.

[21] Appl. No.: 431,193

[22] Filed: Sep. 30, 1982

[51] Int. Cl.³ .............................................. E05D 15/40
[52] U.S. Cl. ...................................... 49/249; 49/254; 49/340; 244/129.5
[58] Field of Search ................. 49/340, 248, 249, 254, 49/37, 30; 244/129.5

[56] References Cited

U.S. PATENT DOCUMENTS

| | | |
|---|---|---|
| 2,748,855 | 6/1956 | Siems et al. . |
| 2,751,636 | 6/1956 | Heinemann et al. . |
| 3,051,280 | 8/1962 | Bergman et al. ............... 49/249 |
| 3,085,297 | 4/1963 | Linderfelt . |
| 3,416,757 | 12/1968 | Maraghe . |
| 3,585,757 | 6/1971 | Ritchie et al. . |
| 3,591,111 | 7/1971 | Spence . |
| 3,647,169 | 3/1972 | Allwright et al. . |
| 3,716,945 | 2/1973 | Cooper et al. . |
| 3,718,171 | 2/1973 | Godwin . |
| 3,802,125 | 4/1974 | Baker . |
| 4,097,009 | 6/1978 | Barnes ............................. 49/254 |
| 4,199,120 | 4/1980 | Bergman et al. . |
| 4,395,000 | 7/1983 | Deviny et al. ............ 244/129.5 XZ |

FOREIGN PATENT DOCUMENTS 1531467 8/1969 Fed. Rep. of Germany .

*Primary Examiner*—Kenneth Downey
*Attorney, Agent, or Firm*—Christensen, O'Connor, Johnson & Kindness

[57] ABSTRACT

An outward-opening, plug-type cargo door for an aircraft is movable between a closed position and an open position in which the door is spaced from the cargo bay opening in a canopy orientation above and outboard of the cargo bay opening. The door hinges are directly driven by irreversible rotary actuators such that the weight of the door cannot back-drive the actuators. The door must be powered to the opened and closed positions thereby eliminating the necessity of a strut to prop the door open when cargo is being loaded and unloaded. The rotary actuators are mounted to the aircraft structure independently of the hinge mechanism's attachment to the aircraft structure so that the actuators can be removed and replaced if necessary without disturbing the hinge mechanism or door linkage. The hinge linkage has been simplified to provide fewer parts for the linkage. The door is manually unlatched from either the interior or exterior of the aircraft through a dual handle system. A spring-biased pawl assembly is mounted on the door and coacts with a latch crank to prevent movement of the handle to the latched position when the door is spaced from the cutout opening. The spring-biased pawl cooperates with a cam surface associated with the cutout opening to permit movement of the handle to the latched position once the door is in the cutout opening.

8 Claims, 13 Drawing Figures

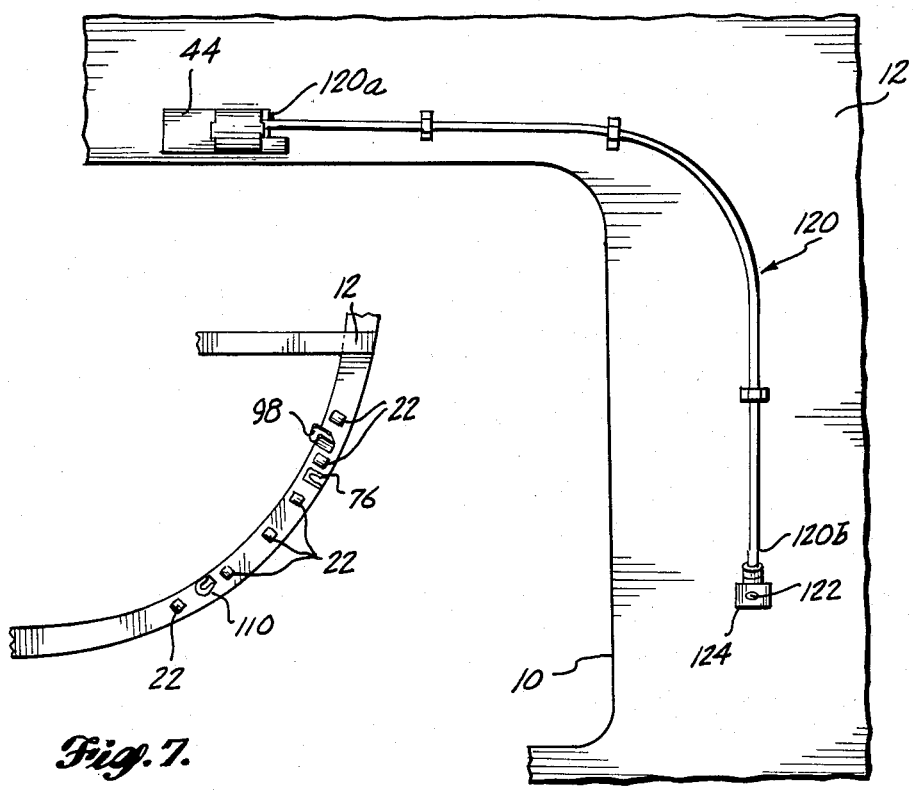
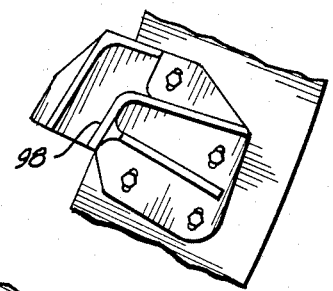
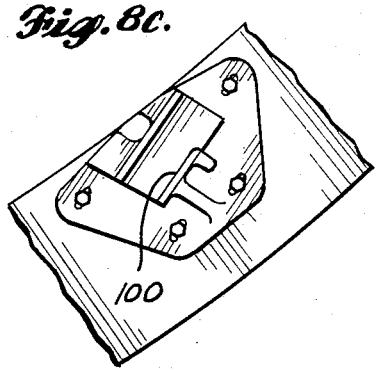
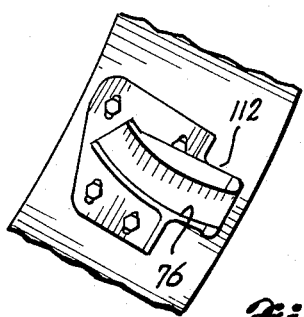

POWERED OUTWARD-OPENING CARGO DOOR

BACKGROUND OF THE INVENTION

This invention relates generally to doors for the cargo areas of transport vehicles, for example, aircraft, and more particularly, relates to a powered, outwardly opening plug-type cargo door for an aircraft.

Outward-opening doors for use in cargo compartments of aircraft are advantageous compared to inward-opening doors in that they do not occupy volume in the cargo compartment that could otherwise be used for cargo. Plug-type doors for aircraft are advantageous over nonplug-type doors in that an adequate level of safety can be achieved with greater simplicity of mechanism by a plug-type door preventing the blowout or accidental opening of the door when the interior cargo compartment pressure is greater than the exterior ambient air pressure, for example, when the aircraft is in flight.

Previous outwardly opening plug-type cargo doors have been spring-counterbalanced and manually operated from the ground. A strut is used to prop the door open while cargo is being loaded and unloaded. The strut propping the door open prevents the door from inadvertently closing due to wind gusts or other external factors that would overcome the counterbalancing of the door. Also, the prior art doors, such as that used on the Boeing 727-200 aircraft include a snubber to control the speed of handle motion from the unlatched to latched position to avoid injury to the operator if the door handle were inadvertently started into the latching direction when the door was not in the cargo bay opening. In such a situation, the full weight of the door could backdrive the handle, injuring the operator if some mechanism were not provided to control the speed of handle motion. The snubber satisfactorily prevents operator injury but is a rather complicated mechanism that provides a source of potential maintenance problems and also additional weight to the aircraft.

SUMMARY OF THE INVENTION

The present invention provides an outward-opening plug-type door, particularly for use in covering the opening into a cargo bay of an aircraft. The door is movable between a position blocking the door opening and a second position in which it is spaced from the door opening in a canopy orientation above and outboard of the cargo bay opening. The door hinges are directly driven by irreversible rotary actuators such that the weight of the door cannot back-drive the actuator. The door must be powered to the opened and closed positions, thereby eliminating the necessity for a strut to prop the door open when cargo is being loaded and unloaded. The rotary actuators are mounted to the aircraft structure independently of the hinge mechanism's attachment to the aircraft structure so that the actuators can be removed and replaced if necessary without disturbing the hinge mechanism or the door linkage. The hinge linkage has been simplified to provide fewer parts to the linkage. The door is manually unlatched from either the interior or exterior of the aircraft through a dual handle system. A spring-biased pawl assembly is mounted on the door and coacts with a latch crank to prevent movement of the handle to the latched position when the door is spaced from the cargo bay cutout opening. The spring-biased pawl cooperates with a cam surface associated with the cutout opening to permit movement of the handle to the latched position once the door is in the cutout opening to the cargo bay.

Preferred embodiments of the cargo door of the present invention may also include manual backup for the power-driven rotary actuators in case of power failure and also pressure-relief doors associated with the cargo door for ensuring equalization of pressure interior and exterior of the aircraft prior to opening of the cargo door to prevent possible blowout of material within the cargo bay due to the pressure differential from the interior to the exterior of the cargo bay.

BRIEF DESCRIPTION OF THE DRAWINGS

The cargo door of the present invention will be better understood by those of ordinary skill in the art and others upon reading the ensuing specification when taken in conjunction with the accompanying drawings wherein:

FIG. 7 is a schematic side elevational view of the airframe cutout opening into the cargo bay that cooperates with the door of FIG. 1;

FIGS. 8A, 8B, and 8C are side elevational views in expanded scale of portions of the airframe cutout pictured in FIG. 7;

FIG. 11 is a diagrammatic front elevational view of the manual backup drive system associated with the door shown in FIG. 1.

DETAILED DESCRIPTION OF THE PREFERRED EMBODIMENT

Figure 1:
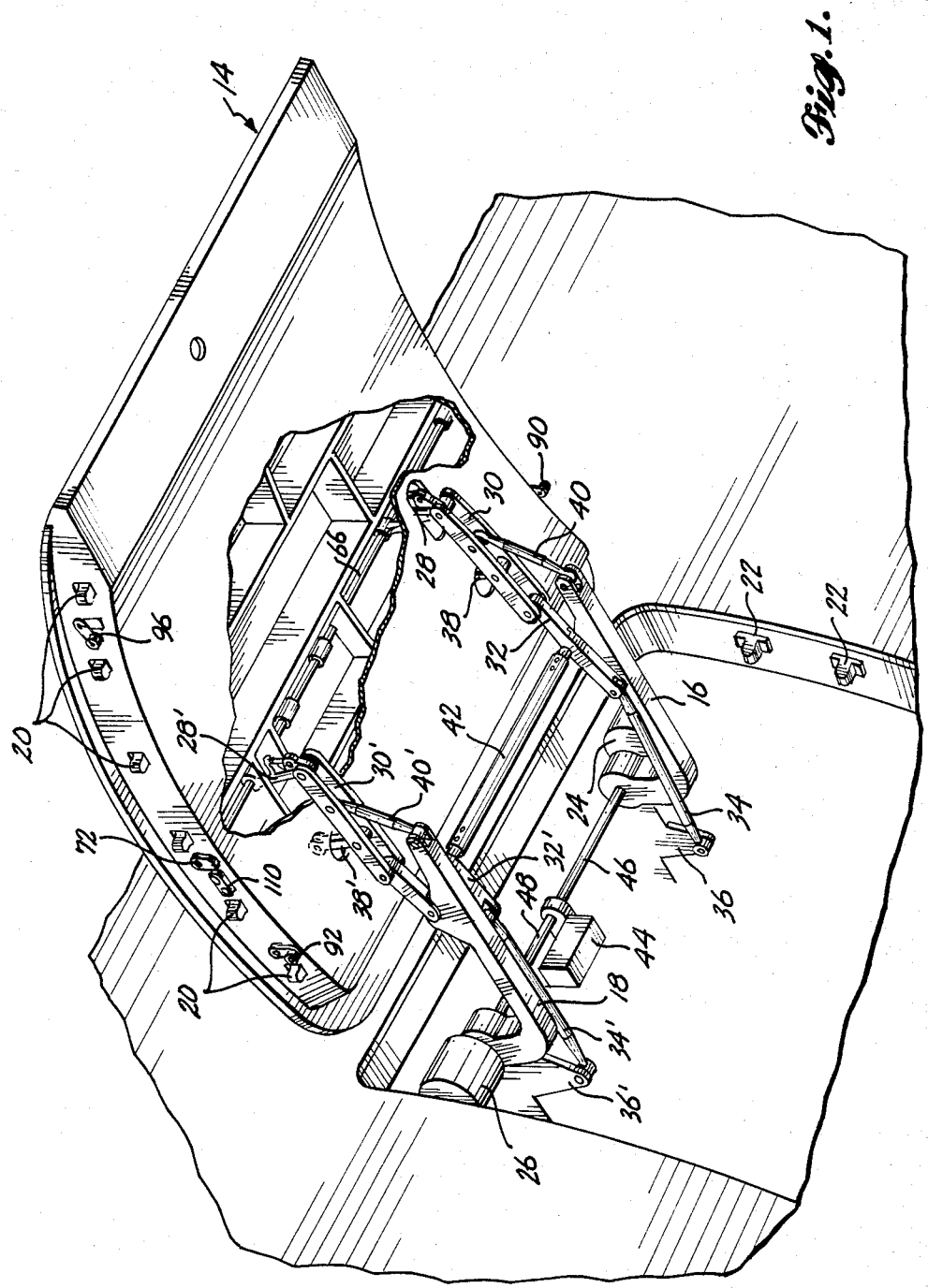
FIG. 1 is an isometric view of one embodiment of a cargo door made in accordance with the principles of the present invention in the fully open position.

Referring to FIG. 1, one embodiment of a cargo door made in accordance with the principles of the present invention is pictured in the open position spaced from a cutout opening 10 in a portion of the fuselage 12 of an aircraft. Typically, the opening 10 will lead to the cargo compartment of the aircraft. The door 14 is mounted through a linkage, which will be described in greater detail below, to forward and aft hinge arms 16 and 18 respectively, which in turn are attached to brackets affixed to the aircraft's structure interior to and adjacent the lintel of the door opening 10. The door 14 is a plug-type door, meaning that the door cannot be opened by pressure differential existing between the interior and exterior of the aircraft. In the case of the door of the present invention, the lower edge of the door in the closed position fits behind door cutout structure and a series of door stops 20 positioned along the sides of the door 14 cooperate with a series of door stop fittings 22 (shown in FIG. 7) affixed to the sides of the cutout opening 10 to prevent motion of the door from the closed position in a direction substantially orthogonal to the plane of the door opening.

The hinge arms 16 and 18 are each drivingly coupled to forward and aft rotary actuators 24 and 26, respectively associated with each of the hinge arms 16 and 18. Each of the hinge arms is coupled to the door 14 by a hinge linkage. The hinges are symmetrically disposed on forward and aft sides of the vertical centerline of the door 14. The hinge linkage associated with the hinge arm 16 includes a lower lift link 28 pivotally attached to the door at a first end thereof and pivotally attached to a hinge link 30 at a second end thereof. A second end of the hinge link 30 is pivotally attached to a first end of a scissors arm 32, which in turn is pivotally attached to the hinge arm 16. Movement of the scissors arm 32 relative to the hinge arm is controlled by a program rod 34 affixed at a first end thereof to a bracket 36, which in turn is affixed to the aircraft structure adjacent the lintel of the door cutout 10. The second end of the program rod is pivotally attached to one end of the scissor arm. An upper lift link 38 is attached at a first end thereof to the door structure and at a second end thereof is pivotally attached to the hinge link 30 at a point between the first and second ends of the hinge link. An adjustable rod 40 is pivotally attached at a first end to the hinge link 30 at a point between the attachment of the upper and lower lift links to the hinge link. The second end of the adjustable rod 40 is pivotally attached to a second end of the hinge arm 16. An identical arrangement of hinge linkage is associated with the hinge arm 18 and includes a lower lift link 28' and an upper lift link 38', which are connected to a hinge link 30'. The hinge link 30' is attached at a second end thereof to a scissor arm 32', which in turn is controlled by a program rod 34'. The program rod 34' is pivotally attached at a first end to an aft bracket 36', which in turn is affixed to the aircraft structure. The program rod 34' is pivotally mounted at a second end thereof to the scissor arm 32'. An adjustable rod 40' is pivotally connected between the hinge link 30' and the hinge arm 18 to maintain the geometry of the linkage. The hinge linkages associated with each of the hinge arms are connected to one another by a scissor arm connecting tube 42 that is attached at a first end thereof to the forward scissor arm 32 and at a second end thereof to the aft scissor arm 32'. The connection of the two scissor arms lends stability to the door and permits the use of a single program rod with each of the hinge arms in comparison to the two program rods typically associated with the hinge mechanism of an outwardly opening canopy configuration door.

Figure 2:
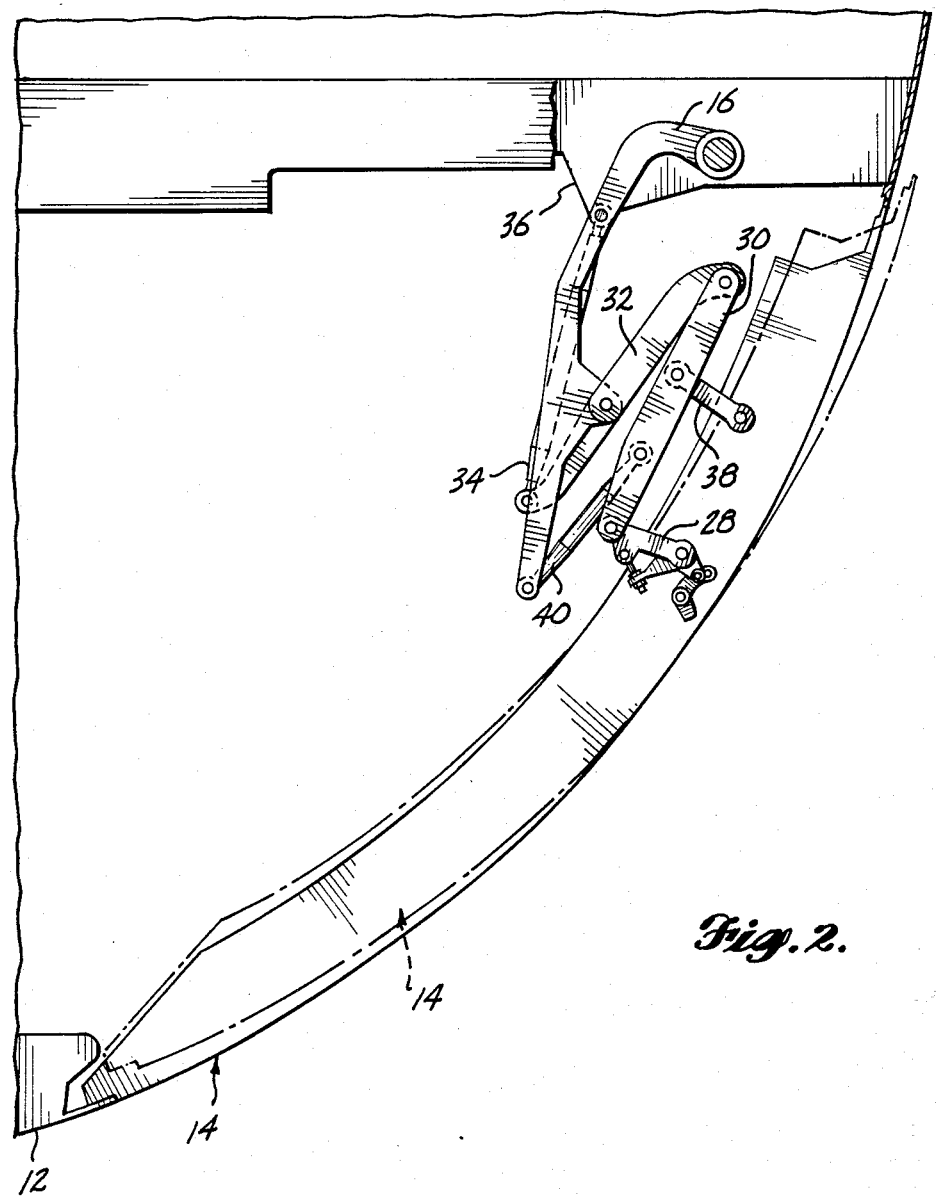
FIG. 2 is a somewhat schematic side elevational view of the door and hinge mechanism of FIG. 1 in the closed and latched position and showing in phantom lines the door in the unlatched position.
Figure 3:
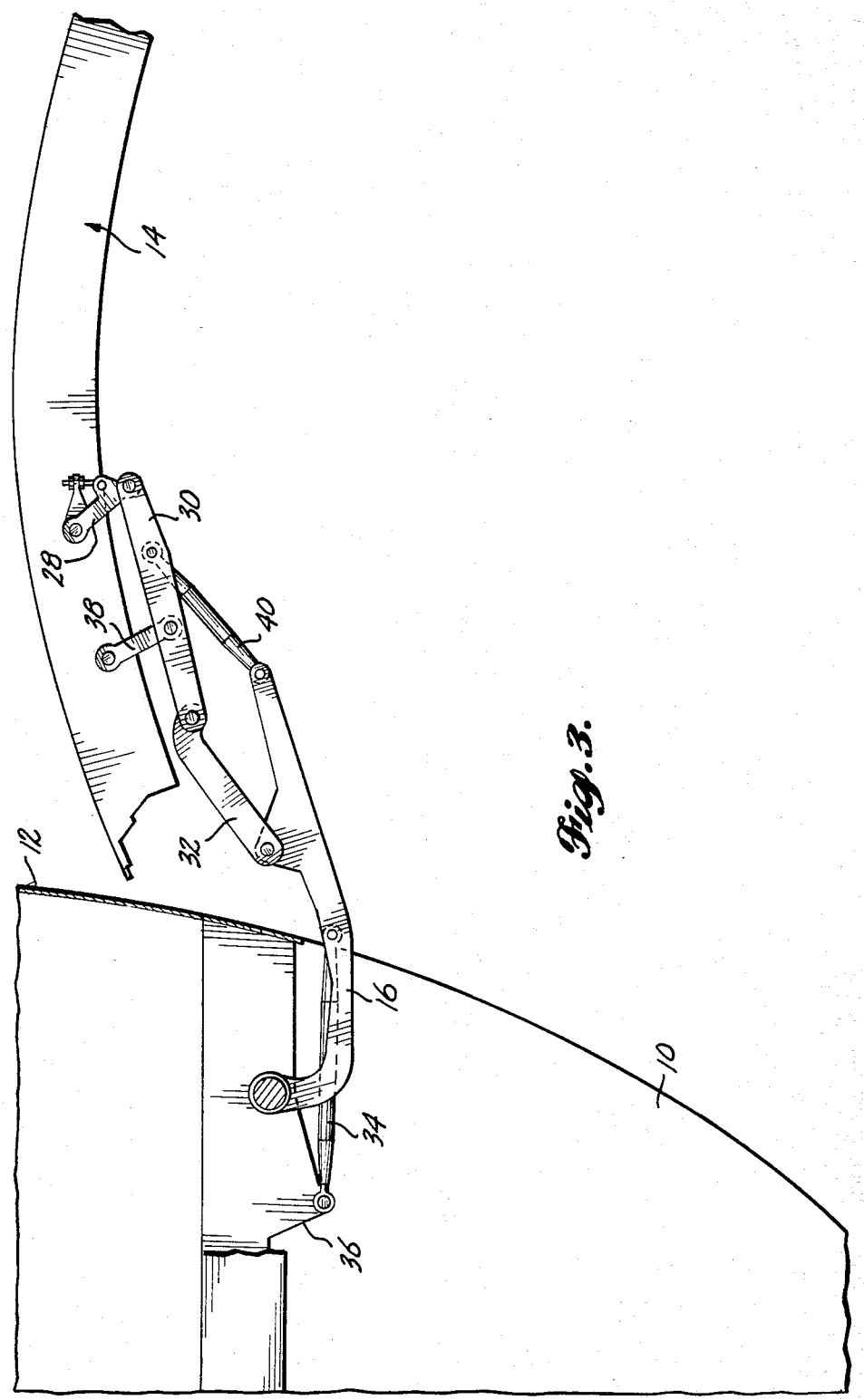
FIG. 3 is a side elevational view of the door of FIG. 1 in the fully opened position.

FIG. 2 shows in solid lines the door of the present invention in the closed and latched condition. FIG. 2 also shows in phantom lines the door of the present invention in the unlatched and lifted condition. The unlatching of the door is accomplished by a mechanism that will be explained in greater detail below. In the process of unlatching the door, the door moves upwardly and inward in order to unplug the door from the cutout to permit swinging movement of the door to the raised canopy position. The hinge linkage described above is designed to move the door not only in a swinging movement upwardly to the canopy position, but also to move the door laterally outboard so that the upper edge of the door does not interfere with the lintel of the cutout. As can be seen in FIG. 3, which shows the door in the full open position, the upper edge of the door 14 is spaced a predetermined distance from the outer skin of the aircraft when the door is in the full open position. Movement of the door outboard as it is being raised is controlled to some extent by the program rods 34 and 34', which are of fixed length and attached to the aircraft structure at a first end thereof.

Figure 4:
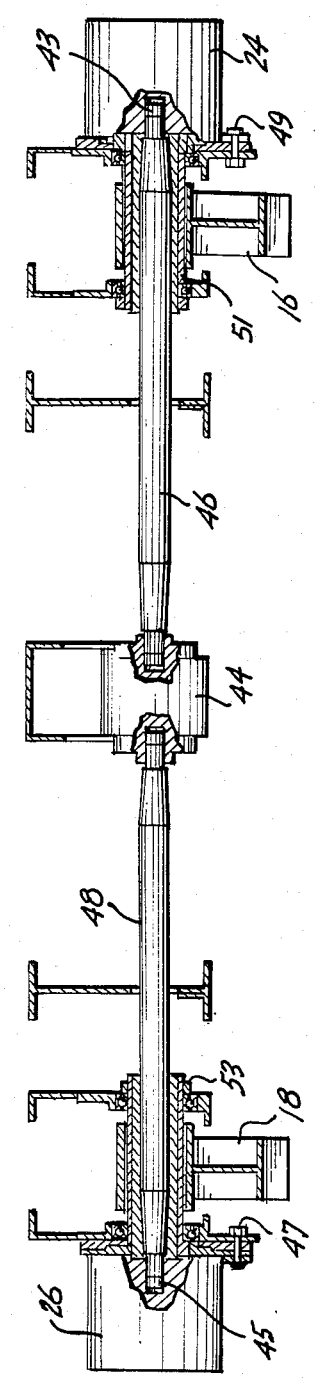
FIG. 4 is a front elevational view of the powertrain associated with the door of FIG. 1.

FIG. 4 illustrates the drivetrain utilized to apply rotary force to the hinge arms to move the door between its open and closed positions. A power unit 44 is mounted adjacent the lintel of the door opening and is typically an electrically powered source of rotary drive motion, such as a DC electric motor. The power unit 44 drives forward and aft drive shafts 46 and 48 that are symmetrically mounted on opposite sides of the power unit 44 parallel to the lintel of the door opening. The driveshafts 46 and 48 pass through their respective hinge arms 16 and 18 and are drivingly coupled by means of a splined shaft or other conventional drive coupling to the respective input shafts 43 and 45 of the rotary actuators 24 and 26 mounted on the aircraft structure. The driveshafts 46 and 48 pass through bushings in the hinge arms 16 and 18 and are free to rotate within the hinge arms without applying any torque to the hinge arms directly. The input shafts of the rotary actuators are internally coupled through a set of reducing gears to the output shafts of the rotary actuators. The hinge arms 16 and 18 are in turn drivingly coupled to the output shafts of the rotary actuators 24 and 26 such that the rotary actuators 24 and 26 apply torque to the hinge arms 16 and 18 to rotate the hinge arms between the open and closed positions. The hinge arms typically are splined and interact with splines on hinge shafts 51 and 53 which in turn are dogged to the respective output shafts of the rotary actuators. The rotary actuators 24 and 26 are nonreversible so that when the door is in the open position, the weight of the door will not back-drive the rotary actuator, but rather remains locked in position until the rotary actuator is driven in the necessary direction to move the door to the closed position. The nonreversibility of the rotary actuator functions to maintain the door locked in the open position without the need for support struts or other structure. The rotary actuators 24 and 26 are attached directly to the aircraft structure by means of bolts, for example, 47 and 49 shown in FIG. 4, thereby permitting removal of the rotary actuator if necessary for maintenance or repair without disturbing the attachment of the hinge arms 16 and 18 to the aircraft. Removal of the rotary actuators 24 and 26 allows the door to move freely between the open and closed positions, thereby permitting manual operation of the door in the event of actuator failure. Of course, in the event of manual operation of the door with the actuators removed, it would be necessary to somehow maintain the door in the open position with structural bracing, since the nonreversible rotary actuators, which normally perform the lockopen function would not be available.

Figure 6:
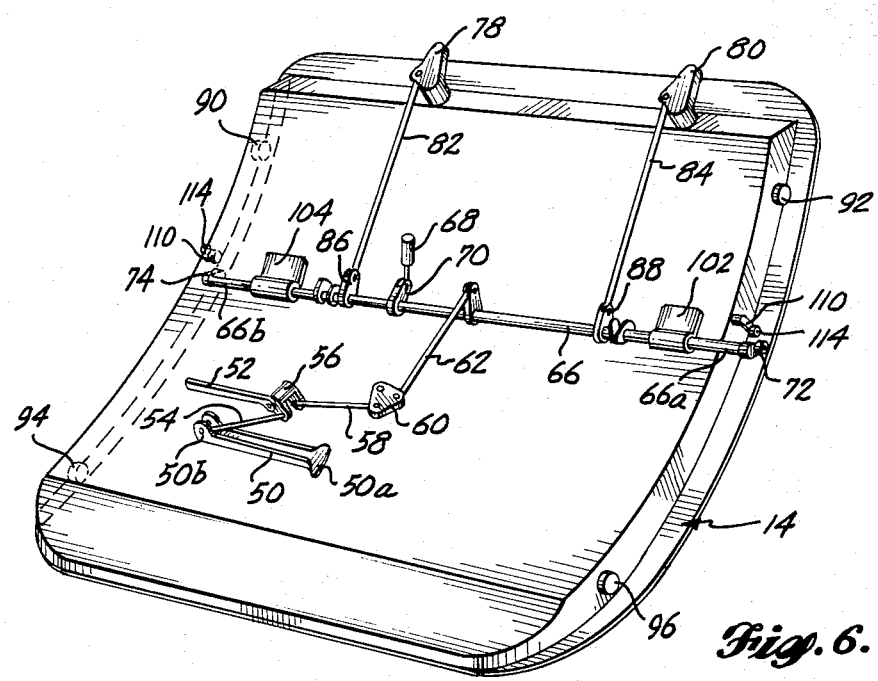
FIG. 6 is a schematic view of the door-latching mechanism associated with the door of FIG. 1.
Figure 5:
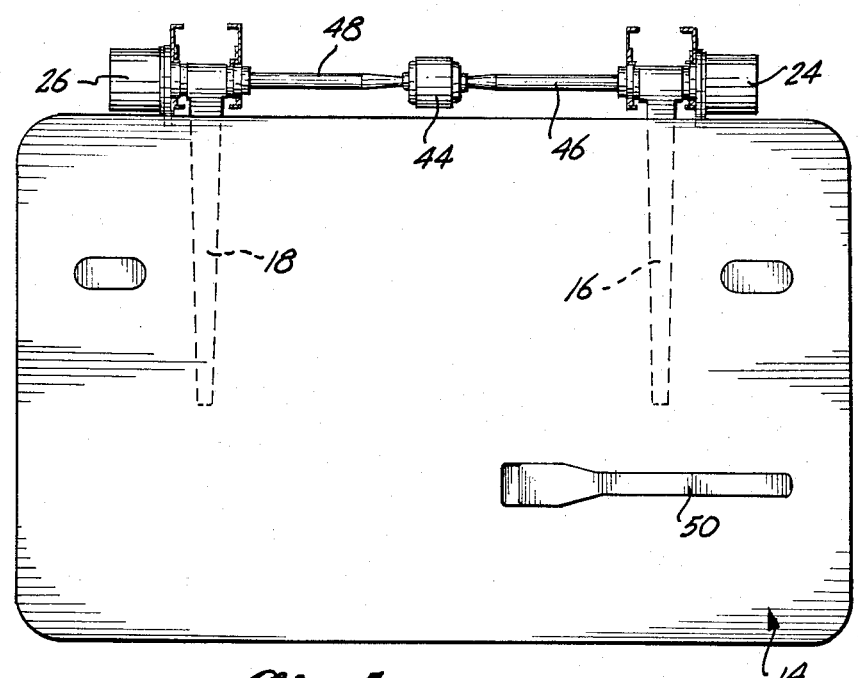
FIG. 5 is a front elevational view of the door of FIG. 1 in the closed position.

As was discussed earlier, because of the "plug" nature of the door, it is necessary to first move the door upwardly to an unlatched position prior to being able to swing it outboard into the fully opened position. In actual practice, as shown by the phantom line drawing of FIG. 2, the door is moved not only upwardly but also slightly inward at the time of unlatching. FIG. 6 shows in somewhat schematic fashion the latching and unlatching mechanism associated with the cargo door of the present invention. The latching and unlatching mechanism is contained within and supported by the door structure. The door can be unlatched either by actuation of the outer handle 50 or the inner handle 52 and the operation of the latching mechanism will be first described with relation to operation of the external handle 50. The external handle 50 is pulled outboard and forward to unlatch the door. A first end 50a of the external handle is freely movable outboard from the aircraft. The second end, 50b, is hingedly attached to a connecting rod 54 and outboard and forward movement of the external handle 50 exerts a pulling force on the control rod 54, which rotates a handle shaft 56 in turn connected by a second connecting rod 58 to a bell crank 60. The second control rod 58 rotates the bell crank 60 which in turn pulls on a third control rod 62 pivotally affixed at a first end to the bell crank 60 and pivotally attached at a second end to a handle crank 64. The third control rod 62 pulls on the handle crank 64 moving it in a direction out of the plane of the page as viewed in FIG. 6. Handle crank 64 is affixed to a latch mechanism torque tube 66 such that rotational movement of the handle crank 64 rotates the torque tube 66. An overcenter spring assembly 68 is affixed between the door structure and an overcenter spring crank 70, which is affixed to the torque tube 66. The overcenter spring 68 is connected in an overcenter linkage arrangement to the overcenter spring crank such that the force of the spring at first resists movement of the torque tube 66 but once it reaches its overcenter position, then assists rotation of the torque tube to assist in unlatching and lifting of the door. A first latch crank 72 is affixed to a first end 66a of the torque tube 66. The latch crank 72 is mounted adjacent one edge, for example, the aft edge, of the door 14. A second latch crank 74 is affixed to a second end 66b of the torque tube adjacent the forward edge of the door 14. Rotation of the torque tube 66 rotates the latch cranks 72 and 74 which are engaged in latch tracks 76 shown in FIGS. 7 and 8B mounted on the frame of the door cutout opening on both the forward and aft sides of the door cutout opening. The latch track 76 is shown in greater detail in FIG. 8B. Since the latch tracks 76 are immovably affixed to the cutout frame structure, rotation of the latch cranks 72 and 74 lifts the door 14 upwardly, disengaging the lower edge of the door 14 from its position behind the cutout structure and also disengaging the door stops 20 from behind the body stop fittings 22 to permit outboard motion of the door 14. Upper door stops 78 and 80 are rotatably mounted adjacent the upper edge of the door 14 and cooperate with door stop fittings mounted in the lintel of the cutout opening to maintain the door in the opening in the latched condition. The upper door stops 78 and 80 are connected by means of connecting rods 82 and 84, respectively, to cranks 86 and 88 affixed to the torque tube 66 and rotatable with the torque tube 66. Rotation of the torque tube 66, therefore, rotates the crank 86 and 88, pulling on the control rods 82 and 84 and rotating the door stops, 78 and 80, out of engagement with the door stop fittings on the lintel of the door frame releasing the door and permitting outboard swinging motion of the door 14. As mentioned above, in actual practice, the door 14 moves upwardly and inwardly in the unlatching process. The motion of the door is controlled by forward and aft upper guide rollers 90 and 92 and forward and aft lower guide rollers 94 and 96 mounted on the forward and aft edges respectively of the door 14. The upper and lower guide rollers cooperate with upper guide tracks 98 and lower guide tracks 100, pictured in FIGS. 7 and 8, to guide the door in its upward and inward motion during the unlatching process. The inner handle 52 is affixed to the handle shaft 56 and is rotatable inboard to apply the same pulling force on the control rod 58, which is provided by outboard movement of the external handle 50. Action of the unlatching mechanism upon inboard movement of the inner handle 52 is identical to that described above for movement of the external handle 50.

Preferably, pressure-relief door cranks 102 and 104 are affixed to the torque tube 66 such that they rotate with rotation of the torque tube 66. The pressure-relief door cranks 102 and 104 are affixed to pressure-relief doors that cooperate with openings in the door outer skin to provide a pressure-relief/pressure-equalization function between the interior and exterior of the cargo compartment prior to opening of the cargo door. The function of the pressure-relief doors is explained in U.S. Pat. No. 2,745,855 issued June 5, 1956 incorporated herein by reference.

Figure 9:
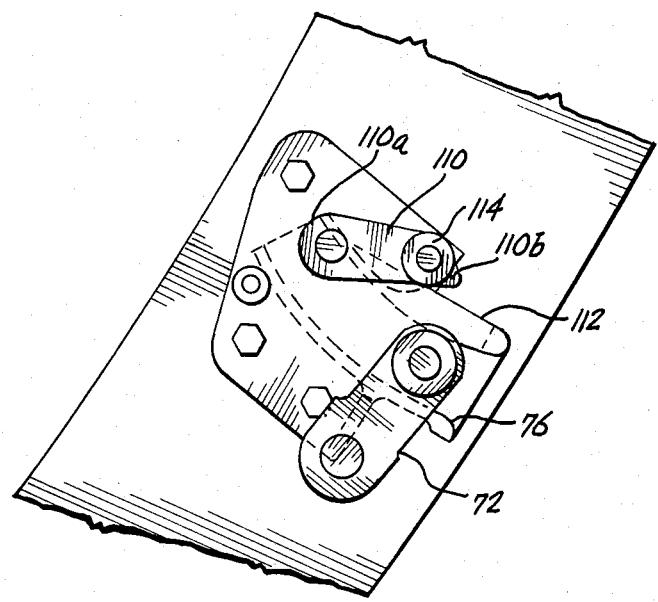
FIG. 9 is a schematic side elevational view of the latching assembly associated with the door of FIG. 1 made in accordance with the principles of the present invention in the latched condition.
Figure 10:
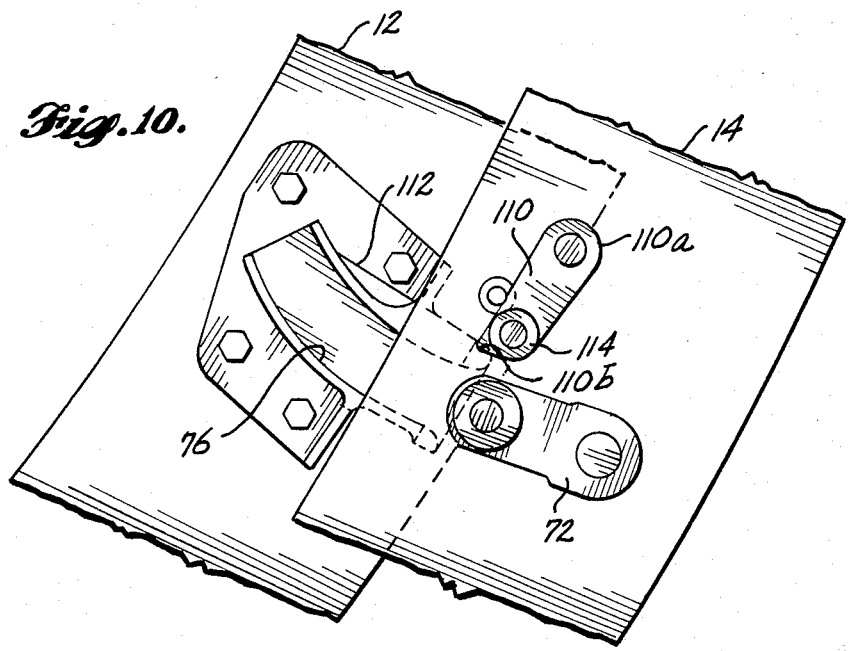
FIG. 10 is a schematic side elevational view of the latching assembly of FIG. 9 in the unlatched and partially open position.

When the door is in the unlatched position, the external handle is in a position substantially orthogonal to the plane of the door skin. For personnel safety it is necessary to provide a mechanism to prevent accidental or inadvertent movement of the door handle back to its closed position, thereby preventing the possibility that an operator could accidentally catch a hand or finger between the door handle and the door when the handle moves to the closed position, thereby causing personal injury. In the door of the present invention a handle lockout pawl 110 is rotatably mounted on each of the forward and aft edges of the door in association with the latch cranks 72 and 74 to perform the function of maintaining the handle in the open position when the door is in the open position. Operation of the lockout pawl is illustrated in FIGS. 10 and 11. The lockout pawl 110 is rotatably mounted at a first end 110a thereof to the edge of the door. The lockout pawl 110 is spring-biased to rotate downwardly (clockwise as viewed in FIG. 9) and is maintained in its position shown in FIG. 9 when the door is in the latched position by a cam surface 112 forward on the upper edge of the latch track 76. When the latch crank 72 is rotated to the unlatched and partially open position shown in FIG. 10 and the door moves upwardly and outwardly from the cutout, the pawl 110 rotates clockwise to the position shown in FIG. 10. The second end 110b of the pawl then coacts with the latch crank 74 to prevent rotation of the latch crank back to its latched position, thereby preventing rotation of the torque tube 66 and consequently through the connecting linkage preventing movement of the handle 50 back to its latched position. When the door 14 is moved back into the opening to be latched again, a roller 114 rotatably mounted on the second end 110b of the handle lockout pawl 110 rides up on the cam surface 112 and rotates the pawl 110 in the counterclockwise direction out of the way of the latch crank 72, thereby permitting rotation of the latch crank to its latched position once the door is in the door opening. A similar lockout pawl is mounted on the aft edge of the door and associated with latch crank 72 in the same manner described above.

As explained earlier, in the event of failure of the rotary actuators, the door can be manually moved after removal of the actuators. This possibility is used only if there is an actual failure in the actuator itself. If power is lost but the actuators are still functioning properly, it is desirable to operate the door through the actuators and therefore a means of supplying drive power to the actuators manually is provided. Referring to FIG. 11, a flexible drive cable 120 is mounted adjacent the door cutout opening in the aircraft frame. A first end 120a of the flexible drive cable attaches to the power unit 44 and a second end 120b of the flexible drive cable is attached to a driving input connection 122 adjacent an opening 124 in the aircraft outer skin. A crank or other handle means can be mounted in the drive mechanism at the connection 122 and power applied manually through the flexible cable to the power unit 44, which in turn drives driveshafts 46 and 48 to turn the rotary actuators and operate the door.

In summary therefore, an outward opening cargo door is provided of the plug type. The door hinges are driven directly by irreversible rotary actuators mounted to the aircraft structure in such a manner that the actuators can be removed without disturbing the hinge mechanism. The door is manually latched and unlatched and spring-biased pawls are provided to lock the handle in the unlatched position to prevent inadvertent moving of the handle to the latched position when the door is spaced from the cutout opening. While a preferred embodiment of a door made in accordance with the principles of the present invention has been described and illustrated herein, those of ordinary skill in the art and others will understand that several changes can be made to the illustrated embodiment while remaining within the scope of the present invention. Therefore, the invention should be defined solely by reference to the claims appended hereto.

The embodiments of the invention in which an exclusive property or privilege is claimed are defined as follows:

1. A door assembly for closing an opening in a wall, said opening including a periphery, said door assembly comprising:
   a door;
   hinge means associated with said door and said opening to mount said door to the periphery of said opening for swinging movement of said door between a first position in which said door is within said opening, and a second position in which said door is spaced from said opening and positioned above said opening in a canopy orientation;
   hinge drive means drivingly coupled to said hinge means for driving said door between said first and second positions;
   power means drivingly coupled to said hinge drive means for providing power to said hinge drive means, said hinge drive means being constructed and arranged such that said hinge drive means drives said hinge means only under power, said hinge means being immovable by manual operation while coupled to said hinge drive means;
   latch means associated with said door and manually operable when said door is in said first position, to move said door upwardly a predetermined distance prior to initiation of movement of said door toward said second position by said hinge drive means, said latch means including a handle means movable between a latched position and an unlatched position, movement of said handle means between said latched and unlatched position causing movement of said door upwardly within said opening; and,
   latch lock-out means associated with said handle means and operable when said door is spaced from said opening to prevent movement of said handle means from said unlatched position to said latched position, and constructed and arranged such that when said door is within said opening, said latch lock-out means is inoperative, thereby permitting movement of said handle means from said unlatched position to said latched position.

2. The door assembly of claim 1 further including hinge drive coupling means for mounting said hinge drive means to said hinge means in such a manner that said hinge drive means is removable from said hinge means without disruption of the operation of said hinge means.

3. The door assembly of claim 1 wherein said latch means further includes:
   a latch track fixed to the periphery of said opening;
   a latch crank cooperable with said latch track and engaged within said latch track when said door is in said first position;
   latch linkage coupling said handle means to said latch crank, said latch crank being rotatable upon movement of said handle means from said latched position to said unlatched position to coact with said latch track to lift said door said predetermined distance;
   a lock-out pawl rotatably mounted on said periphery adjacent said latch track;
   pawl-biasing means associated with said lock-out pawl for biasing said lock-out pawl into a first position in which it cooperates with said latch crank to prevent rotation of said latch crank;
   cam means associated with said latch track and cooperable with said lock-out pawl to move said lock-out pawl from said first position when said door moves into said opening to permit rotation of said latch track when said door is in said opening.

4. The door assembly of claim 1 further including hinge linkage means coupling said hinge means to said door, said hinge linkage means being constructed and arranged to move an upper edge of said door linearly away from said wall simultaneously with the swinging movement of said door from said first position to said second position.

5. The door assembly of claim 1 wherein said power means is mounted on the periphery of said opening, said hinge drive means includes a nonreversible rotary actuator removably and drivingly mounted on said hinge means and driveshaft means coupling said power means to said rotary actuator.

6. The door assembly of claim 5 wherein said hinge means is mounted intermediate said power means and said rotary actuator, said driveshaft passing through an opening formed in said hinge means, said driveshaft being freely rotatable within said opening.

7. The door assembly of claim 1 further including manual power drive means associated with said hinge drive means for supplying manual drive power to said hinge means in the event of failure of said power means.

8. The door assembly of claim 1 further including:
   pressure-relief openings formed in said door for equalizing pressure on either side of said door;
   pressure-relief doors mounted on said door and associated with said pressure-relief openings to close said openings when said door is in said first position; and, pressure-relief linkage means coupling said pressure-relief doors to said handle and operable upon movement of said handle from said latched position to said unlatched position to open said pressure-relief doors to equalize pressure on either side of said door prior to movement of said door to said second position.

* * * * *